United States Patent [19]

Takubo et al.

[11] 3,818,146

[45] June 18, 1974

[54] SIGNAL INTERRUPTER CIRCUIT FOR A KEY TELEPHONE SYSTEM

[75] Inventors: Hachiroh Takubo, Kawasakishi; Fumio Tsutsumi, Yokohama, both of Japan

[73] Assignees: Nippon Tsu Shin Kogyo K.K., Kanagawa-ken, Japan; TIE/Communications, Inc., Stamford, Conn.

[22] Filed: Apr. 5, 1973

[21] Appl. No.: 348,278

[30] Foreign Application Priority Data

Jan. 9, 1973 Japan ................................ 48-4975

[52] U.S. Cl. ............. 179/84 A, 179/18 AD, 179/99

[51] Int. Cl. ............................................. H04q 1/30

[58] Field of Search ......................... 179/89 R, 89 A

[56] References Cited

UNITED STATES PATENTS 3,471,651 10/1969 Saia et al. ........................ 179/84 A

*Primary Examiner*—William C. Cooper
*Attorney, Agent, or Firm*—Kenyon & Kenyon

[57] ABSTRACT

An interrupter circuit for a key telephone system is disclosed by which a plurality of flip-flop circuits, oscillators and NAND gates are used to generate two staggered periodic signals each representing one of two simultaneously occuring continuous signals. The circuit finds application in the audible signalling circuit of a key telephone system to permit distinguishing between two simultaneously occurring intercom and central office (or PBX) calls.

3 Claims, 2 Drawing Figures

SIGNAL INTERRUPTER CIRCUIT FOR A KEY TELEPHONE SYSTEM

BACKGROUND OF THE INVENTION

The present invention relates in general to an interrupter circuit; and, more particularly, to an interrupter circuit to permit discriminating between two audible signals such as both intercom and central office call arrival or call signal tones occurring simultaneously at a single or two nearby key telephone sets.

Previously, when a central office call and an intercom call signal simultaneously arrived at a key telephone, the two audible tone devices were simultaneously operated and it was difficult to distinguish between the two signals. Even when two such signals of different pitches were used, if they were both sounded simultaneously in close proximity, it was difficult to recognize and distinguish between them.

It iw therefore an object of the interrupter circuit of the present invention to overcome this problem by using a combination of flip-flop circuits, oscillators and NAND gates to control the signal tones, so that if the two calls arrive simultaneously at a telephone, it is possible to stagger the time sequence of the two periodically repeated signals and thereby permit distinguishing between the two signals.

BRIEF DESCRIPTION OF THE DRAWINGS

The invention, as well as its features and objects, will be better understood by reference to the detailed description of the preferred embodiment which follows, taken in conjunction with the accompanying drawings in which.

DETAILED DESCRIPTION OF THE PREFERRED EMBODIMENT

Figure 1:
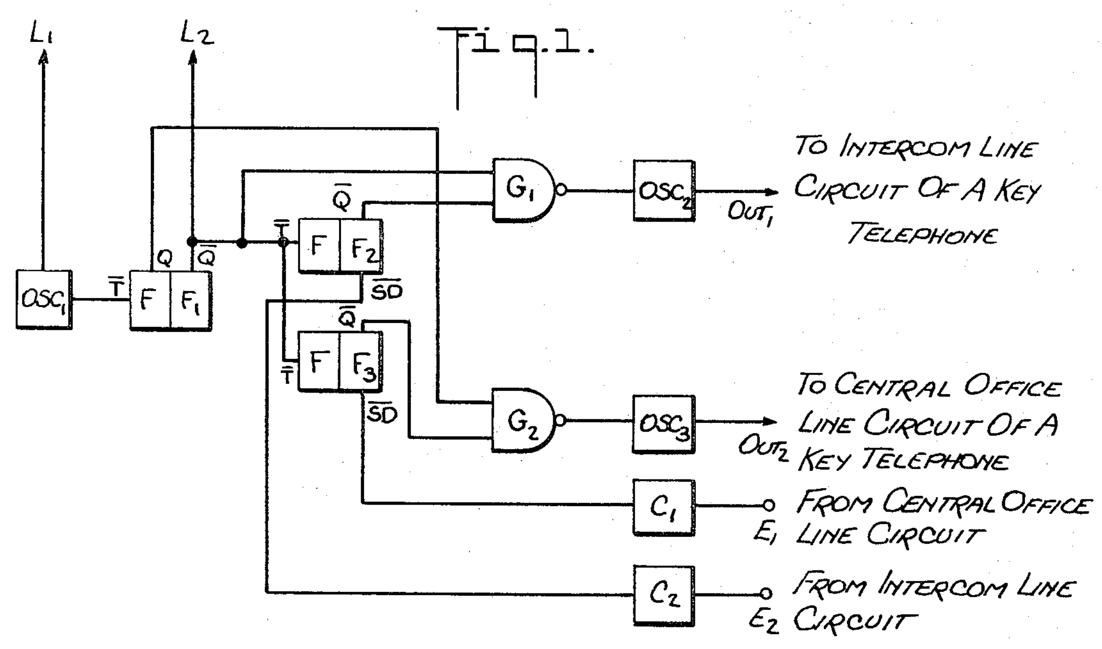
FIG. 1 is a block diagram of the preferred embodiment for carrying out this invention.

In the interrupter circuit of the present invention, as shown in FIG. 1, a pulse generator OSC1, generates output pulses at a predetermined frequency four times the desired repetition rate of the audible signals. The outputs of a plurality of JK flip-flop circuits FF1, FF2, and FF3 are connected to the inputs of NAND gates G1 and G2. OSC2 and OSC3 are audio frequency signal generators used to generate intercom and central office call arrival signals for a key telephone system and are operated by the outputs from NAND gates G1 and G2 respectively.

Output terminal OUT1 is connected to the intercom line audible signalling circuit of a key telephone system while terminal OUT2 is connected to a central office line audible signalling circuit of a key telephone system. L1 and L2 are output terminals which may be connected to the key telephone system lamp flashing control circuits. The outputs of circuits C1 and C2 are connected as inputs to control flip-flop circuits FF2 and FF3 respectively. The circuits C1 and C2 are comprised of either relay contacts or transistor switching circuits. Terminals E1 and E2 receive start signals from the signal control circuits when an incoming central office call (terminal E1) or an intercom call (terminal E2) occurs, and until such calls are answered.

Upon the arrival of a start signal at terminal E1, due to the arrival of a central office call, circuit C1 (a relay or transistor switching circuit) starts the JK flip-flop circuit FF3. The clock input to circuits FF2 and FF3 is the complementary output of the JK flip-flop circuit FF1, equal to one-half the fixed output frequency of OSC1. The outputs of FF-1, FF1Q and FF1$\bar{Q}$ respectively, have the waveforms shown in FIGS. 2(*b*) and (*c*) respectively, FIG. 2(*a*) representing the output of OSC1. The JK flip-flop circuits FF2 and FF3, therefore, have outputs FF2$\bar{Q}$ and FF3$\bar{Q}$, shown in FIG. 2(*d*). These outputs are then each fed to one of the inputs of NAND gates, G1 and G2 respectively.

Figure 2:
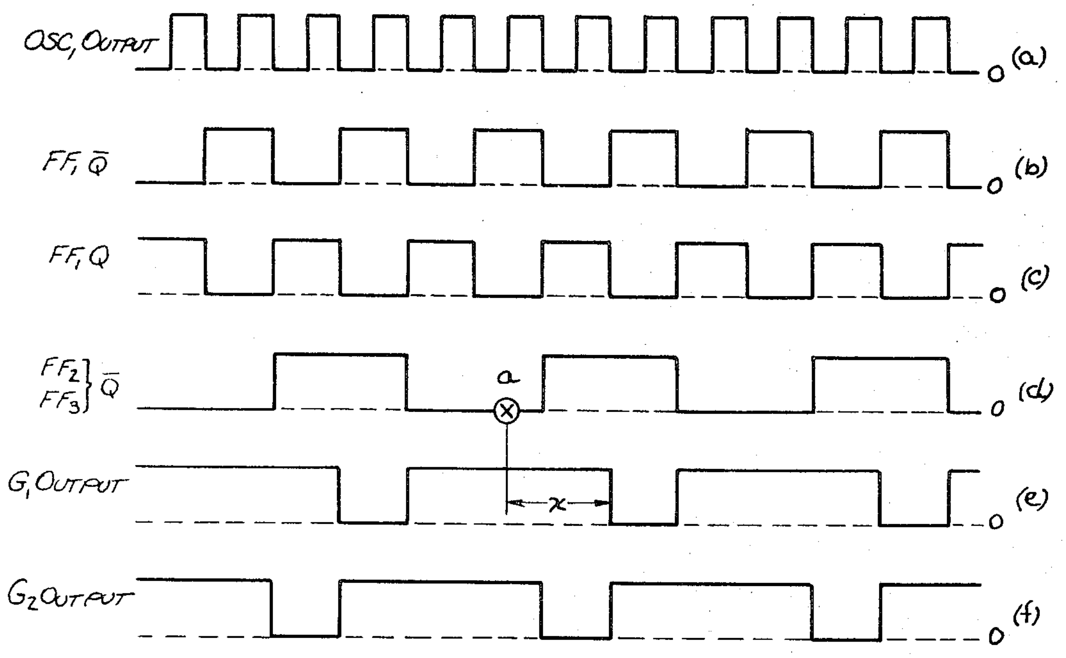
FIG. 2 is a plot of voltage signals at various locations in the circuit plotted against time.

The other inputs to NAND gates G1 and G2 are the outputs of the JK flip-flop circuit FF1, FIG. 2(*b*) and (*c*) respectively. Because the output of the NAND gate G1 only becomes low when both its inputs are high, the output of NAND gate G1 is as shown in FIG. 2(*e*). Similarly, the output of NAND gate G2 is low only when both its inputs are high, and therefore the output of gate G2 is as shown by FIG. 2(*f*). These outputs are used to drive oscillators OSC2 and OSC3 respectively, which only produce outputs when their inputs are low. The OSC2 and OSC3 outputs are fed to a key telephone system through terminals OUT1 and OUT2 to give an audible indication of intercom and central office calls respectively.

If there is an intercom start signal applied to terminal E2 simultaneously with the central office call start signal on terminal E1, the oscillator OSC2 produces a periodic output tone signal on output terminal OUT1 which has the same intervals as the periodic output tone signal on terminal OUT2 but is displaced in time, as shown in FIGS. 2(*e*) and (*f*).

Thus, when an incoming central office line signal applies a start signal to terminal E1 at time *a*, (FIG. 2*d*) the output signal of NAND gate G2 is delayed by a predetermined time delay X as shown in FIG. 2(*e*).

As clearly shown by comparing FIGS. 2(*e*) and (*f*), the two signals are displaced in time. Consequently, even if an intercom and a central office call arrive simultaneously, because the audible signals are staggered, they are easily distinguished from each other.

It is to be understood that the embodiment of this invention described herein is merely intended to illustrate the operative principles of the invention and is not to be considered as limiting the scope of the invention. Modifications may be made by those skilled in the art without departing from the spirit of the invention.

What is claimed is:

1. An interrupter circuit in a key telephone system to produce plural staggered, periodically repeated outputs, in response to start signals from the central office line incoming call and intercom call signalling circuits, comprising:

a periodic pulse generating means having an output at a predetermined frequency;

a timing circuit means comprising a plurality of flip-flop circuit means interconnected to NAND gate means for each output, the combination of the flip-flop circuits, connected to and driven by the output of the pulse generating means and driving the NAND gates, producing outputsignals from the NAND gates to drive plural audible signalling means so that their periodic outputs have identical ON and OFF intervals but are staggered in time with respect to the other.

2. An interrupter circuit as in claim 1 wherein the pulse generating means is a semiconductor oscillator;

and the timing circuit means is comprised of a flip-flop circuit means operating the NAND gate in each output circuit, the flip-flop circuit means having a first flip-flop circuit means driven by the oscillator, the inverse output of the first flip-flop circuit means being fed as one input to one NAND gate and the non-inverse output of the first flip-flop circuit means being fed as one input to the other NAND gage so that the outputs of both NAND gates are at the same frequency but are staggered in time with respect to each other.

3. An interrupter circuit connected within the central office and intercom line call signalling circuits of a key telephone system to produce a time difference between two simultaneous periodically repeated call signals comprising:

intercom and central office line signal circuit starting means;

a first and second J-K flip-flop circuit means connected in each line circuit and arranged to be started in response to its corresponding line circuit starting means;

a pulse generating means having a predetermined output frequency;

a third J-K flip-flop circuit means connected to the output of the pulse generating means and gated to produce pulse and inverse pulse outputs at one-half the input frequency, the inverse frequency output being connected to the clock inputs of the first and second J-K flip-flop circuits;

a first and second NAND gate whose output is connected to the intercom and central office line audible signal circuit means respectively;

the second NAND gate, controlling the central office line audible signal circuit, having one input connected to the inverted output of the second J-K flip-flop circuit and its other input connected to the non-inverted output of the third J-K flip-flop circuit means;

the first NAND gate, controlling the intercom line audible signal circuit, having one input connected to the inverse output of the first J-K flip-flop circuit and its other input connected to the inverse output of the third J-K flip-flop; and an audible signalling means connected to the output of each NAND circuit;

whereby two simultaneous signals appearing on the intercom and central office audible signal starting circuit means produce a staggered, periodic output signal from each audible signal means of the same intervals.

* * * * *